United States Patent [19]

Cavalieri

[11] Patent Number: 4,638,602
[45] Date of Patent: Jan. 27, 1987

[54] TURBINE BLADE HOLDING DEVICE

[76] Inventor: Dominic A. Cavalieri, P.O. Box 248, Hibernia Rd., Salt Point, N.Y. 12578

[21] Appl. No.: 838,943

[22] Filed: Mar. 12, 1986

Related U.S. Application Data

[63] Continuation-in-part of Ser. No. 815,945, Jan. 3, 1986, abandoned.

[51] Int. Cl.$^4$ .............................................. B24B 41/06
[52] U.S. Cl. .................................. 51/217 R; 269/296; 29/156.8 B
[58] Field of Search ........................ 51/217 A, 217 R; 269/296, 297, 93, 94; 29/156.8 B

[56] References Cited

U.S. PATENT DOCUMENTS

| | | | |
|---|---|---|---|
| 2,565,925 | 8/1951 | Lombard | 51/217 R |
| 3,331,166 | 7/1967 | Brenning | 51/217 R |
| 3,818,646 | 6/1974 | Peterson | 51/217 R |
| 4,033,569 | 7/1977 | Dunn | 51/217 R |
| 4,128,929 | 12/1978 | DeMusis | 29/156.8 B |
| 4,589,175 | 5/1986 | Arrigoni | 51/217 R |

Primary Examiner—Harold D. Whitehead
Attorney, Agent, or Firm—Laubscher & Laubscher

[57] ABSTRACT

A turbine blade holding device is disclosed for accurately holding a turbine blade relative to its stacking axis during grinding of the root form portion thereof. The device includes a fixed base and front and rear datum plates for supporting spaced sections of the air foil portion of the blade. A longitudinally extending pin is connected with the base and is designed to abut against the datum point of the blade. A clamping mechanism clamps the blade against the pin and the datum plates, with the front datum plate supporting the leading and trailing edges of the blade and the rear datum plate supporting the leading edge of the blade. The clamping mechanism includes an elongated clamp pivotally connected with the base and arranged along the fulcrum of the blade.

18 Claims, 16 Drawing Figures

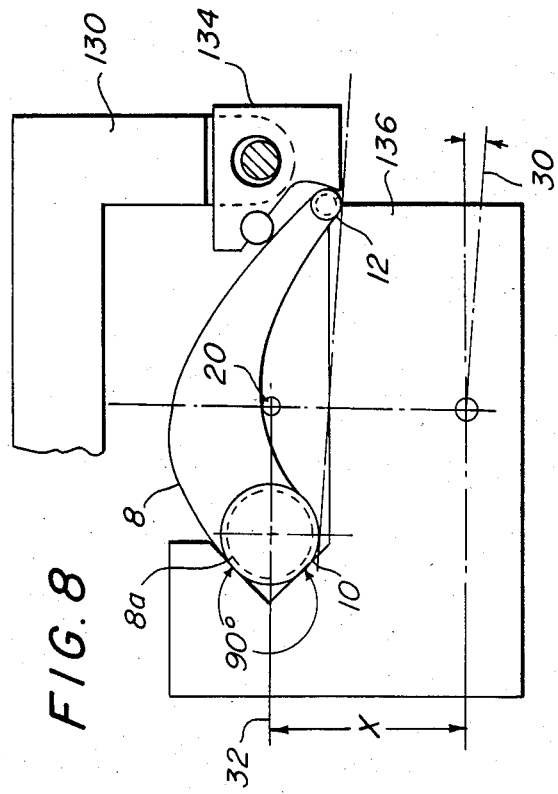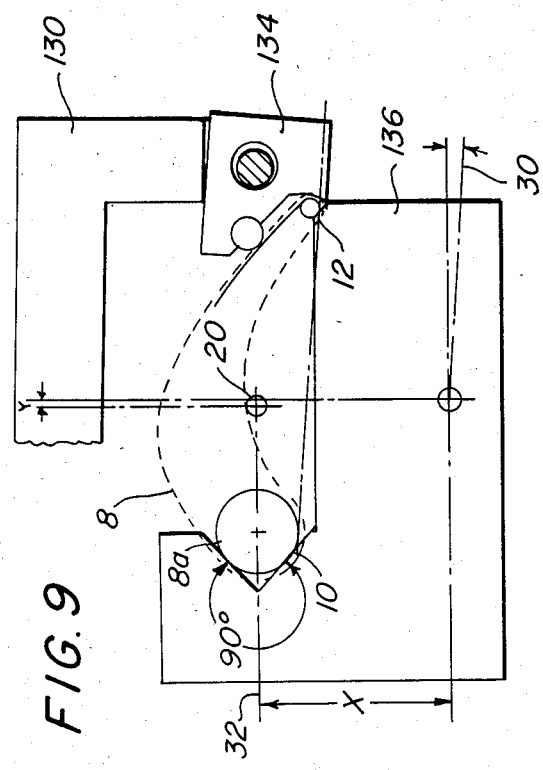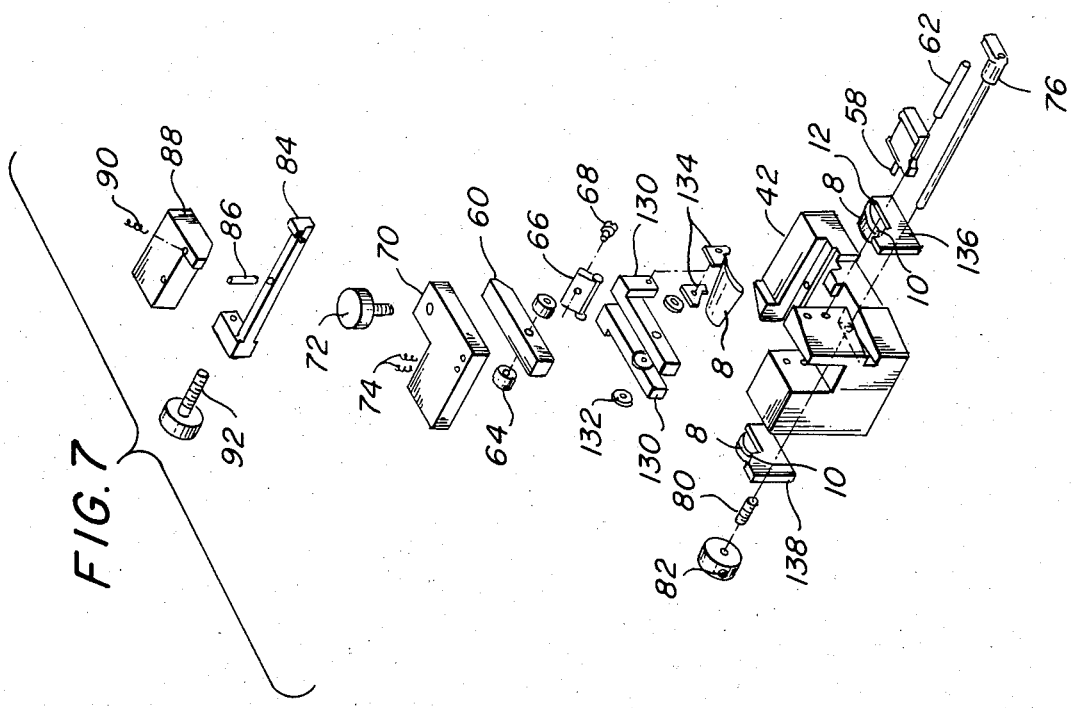

TURBINE BLADE HOLDING DEVICE

This application is a continuation-in-part of application Ser. No. 815,945 filed Jan. 3, 1986 now abandoned.

BACKGROUND OF THE INVENTION

In a turbine assembly such as an airplane engine or the like, a plurality of turbine blades are connected with and extend radially from a rotational disk or hub. Each blade includes a root form portion which is serrated to fit within similarly configured slots in the disk to lock the blades in place. Each turbine blade has a precise configuration, the tolerances of which are determined by the accuracy of the root form.

The present invention relates to a device for securely holding a turbine blade during machining or grinding of the serrations in the root form. In accordance with the invention, the root form may be ground more accurately, thereby improving the tolerances of the entire configuration of the blade.

BRIEF DESCRIPTION OF THE PRIOR ART

After a turbine blade has been cast, it was known in the art to arrange the air foil portion of the blade in a mold or matrix block and to fill the mold with molten lead which hardens to form a lead block. Typically, the root form portion of the blade extends from the lead block, the block is mounted in a fixture, and the serrations are ground in the protruding root form portion of the blade.

A major drawback of the use of lead blocks is that the lead is porous and flexible, even when in the solid state. Thus, the lead block can not be securely held during grinding of the root form, whereby inaccuracies in the root form are developed. Since the root form provides the basis for all of the critical dimensions in the blade, the entire blade will be inaccurate where the root form is not ground to the proper specifications.

Furthermore, the prior methods of manufacture are quite expensive and time consuming. A major expense is the cost of the lead used to form the lead block for each turbine blade. Additional tooling including the lead mold, the molten lead supply, and the fixture for holding the lead form are also required. Finally, a great deal of time is wasted while waiting for the lead to solidify in the lead form and in breaking the lead away from the blade following the grinding operation.

Turbine blade holding devices are also known in the patented prior art as evidenced by the patents to Brenning Pat. No. 3,331,166 and Arrigoni Pat. No. 4,400,915. While these devices normally operate satisfactorily, they are designed for machining the air foil portion of the blade rather than the root form portion. A major drawback of the prior blade holders is that they are incapable of accurately and securely holding a plurality of successive turbine blades during grinding of the root form portions of the blades, whereby each root form, and thus each blade, will be uniform in dimension and configuration.

The present invention was developed to overcome these and other drawbacks of the prior devices by providing a holding device which aligns the blade air foil stacking line and the root center line in the proper position at all times. This allows the operator to load the blade, grind the root form, and unload the blade in less time than is necessary with conventional lead mold forming techniques. Moreover, a blade may be accurately reloaded in the holder, if necessary, for additional machining.

SUMMARY OF THE INVENTION

Accordingly, it is a primary object of the present invention to provide a device for securely holding a turbine blade during grinding of the root form portion thereof. The holder includes a fixed base. A first datum plate for supporting the leading and trailing edges of a first section of the blade is removably connected with the front portion of the base. A second datum plate is removably connected with the rear portion of the base for supporting the leading edge of a second section of the blade. A longitudinally extending pin is connected with the base and adapted to abut against the datum point of the blade. In order to clamp the blade against the datum plates, an elongated clamp is pivotally connected with the base and arranged along the fulcrum of the blade. The clamp is pivotally displaced against the upper surface of the blade upon operation of a torgue screw to securely hold the blade against the datum plates and the pin.

More specifically, the clamp is pivotally connected with one end of a clamping arm which in turn is pivotally connected with the base. A spring at the other end of the arm normally biases the clamp away from the blade. The torque screw is operable to displace the clamping arm against the biasing force of the spring.

According to another object of the invention, each datum plate includes an upper horizontal edge for supporting the blade sections and an inclined edge against which the blade forward portion is urged owing to the clamping force exerted on the fultrum of the blade.

The pin normally extends from the front of the base adjacent the first datum plate to engage a datum point on the shelf portion of the blade. Alternatively, the pin may extend from the rear of the base adjacent the second datum plate where the blade contains a shroud having the datum point located thereon.

Additional clamps may also be connected with the base to further clamp the blade after operation of the torque screw to set the blade in the appropriate position relative to the pin and the datum plates.

BRIEF DESCRIPTION OF THE FIGURES

Other objects and advantages of the subject invention will become apparent from a study of the following specification when viewed in the light of the accompanying drawing, in which:

FIG. 7 is an exploded perspective view of a third embodiment of the turbine blade holder;

FIG. 8 is a front view of an alternative embodiment of the front datum plate with the holding clamp of the embodiment of FIG. 7 for holding an airfoil at the maxium blade thickness;

FIG. 9 is a front view of the plate of FIG. 8 for holding an airfoil at the minimum blade thickness;

DETAILED DESCRIPTION

Figure 1:
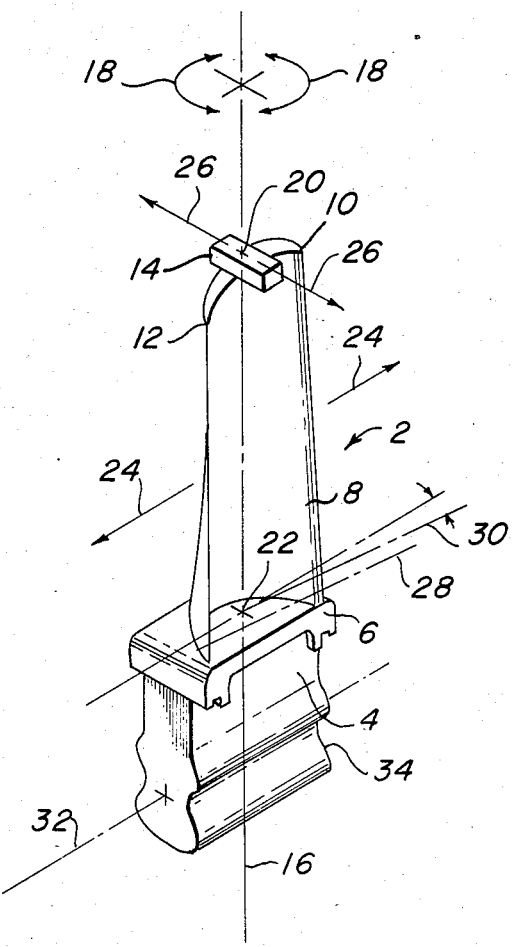
FIG. 1 is a perspective view of a turbine blade.

For a complete understanding of and appreciation for the present invention, it is necessary first to describe the design and configuration of a turbine blade which is shown in FIG. 1. The blade 2 includes a root form portion 4, a shelf portion 6, an air foil portion 8 having a leading edge 10 and a trailing edge 12, and an optional shroud 14. Turbine blades are normally cast as an integral unit. Each turbine blade has a stacking axis 16 which corresponds with the centerline of the air foil portion of the blade. Rotation of the air foil about the stacking axis is referred to as twist as shown by the arrows 18. The point at which the stacking axis emerges from the shroud 14 is the stacking point 20. A datum point may be located at a predetermined distance from the shroud where the stacking axis enters the same. Where no shroud is provided on the blade, the datum point 22 is located on the shelf at a predetermined distance from where the stacking axis passes therethrough.

Deflection of the air foil 8 from front to rear relative to the root form 4 is referred to as tilt as shown by the arrows 24. Deflection of the air foil from side to side is referred to as lean as shown by the arrows 26.

A tangent line 28 is that line adjacent the shelf 6 and normal to the stacking axis 16 which is defined between the leading 10 and trailing 12 edges of the air foil section. The tangent angle 30 is defined as the angle between the tangent line 28 and a line through the datum point 22 parallel to the root form centerline 32.

The air foil portion 8 of a turbine blade can be divided into an infinite number of sections which are stacked upon one another. The configuration of each section is designated around the stacking point therefor, the stacking point being located along the stacking axis 16 at the location bisected by the horizontal plane through which an individual air foil section is taken.

The root form portion 4 of the blade is ground to form a plurality of serrations 34. The orientation of the serrations is critical to insure that the entire blade is properly arranged in a turbine assembly. More particularly, a turbine assembly (not shown) comprises a plurality of turbine blades connected with and extending radially from a central, rotatable disk. The disk contains a plurality of slots or recesses, there being one recess for each blade. Each recess is configured to receive the serrated root form of the blade. For maximum efficiency in operation of the turbine assembly, it is apparent to those skilled in the art that the blades and their root forms must be accurately shaped for cooperation with the other blades of the assembly. Moreover, where the blades are provided with the shrouds 14, the shrouds of adjoining blades are designed to be in continuous relation to each other. Thus, to insure proper alignment of the shrouds, the orientation and configuration of the root form serrations are critical.

Figure 2:
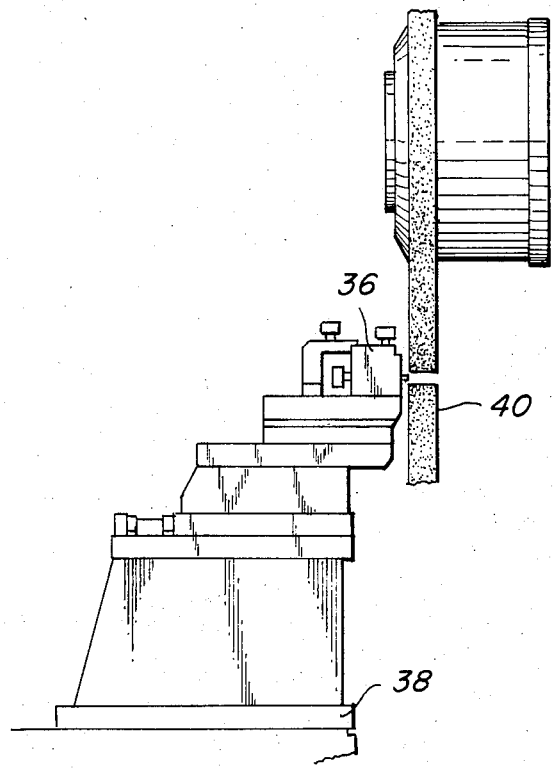
FIG. 2 is a front plan view of the turbine blade holder according to the invention arranged adjacent a grinding wheel.

Referring now to FIG. 2, the holding device 36 of the present invention is shown mounted in a fixed orientation on a table 38 or the like adjacent a grinding wheel 40. The rotating grinding wheel may be displaced relative to a turbine blade root form secured in the holder 36 in a conventional manner to grind the root form in order to form the serrations therein.

A plurality of turbine blade holding devices 36 may be arranged in parallel opposite the grinding wheel 40. The wheel may be reciprocated adjacent the plurality of turbine blade holders to accurately machine or grind a plurality of root forms substantially simultaneously.

Figure 3:
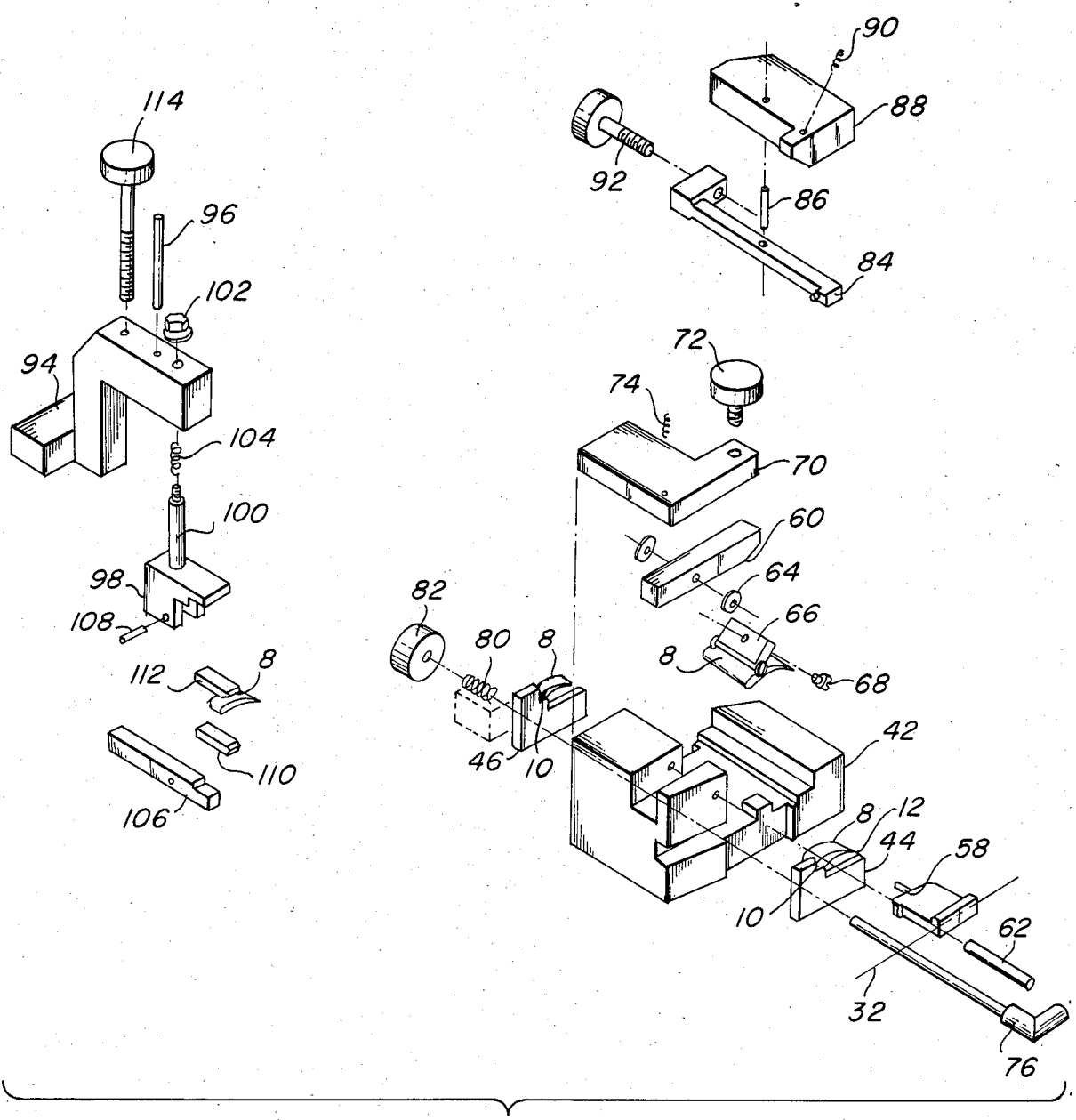
FIG. 3 is an exploded perspective view of a first embodiment of the turbine blade holder according to the invention.
Figure 14:
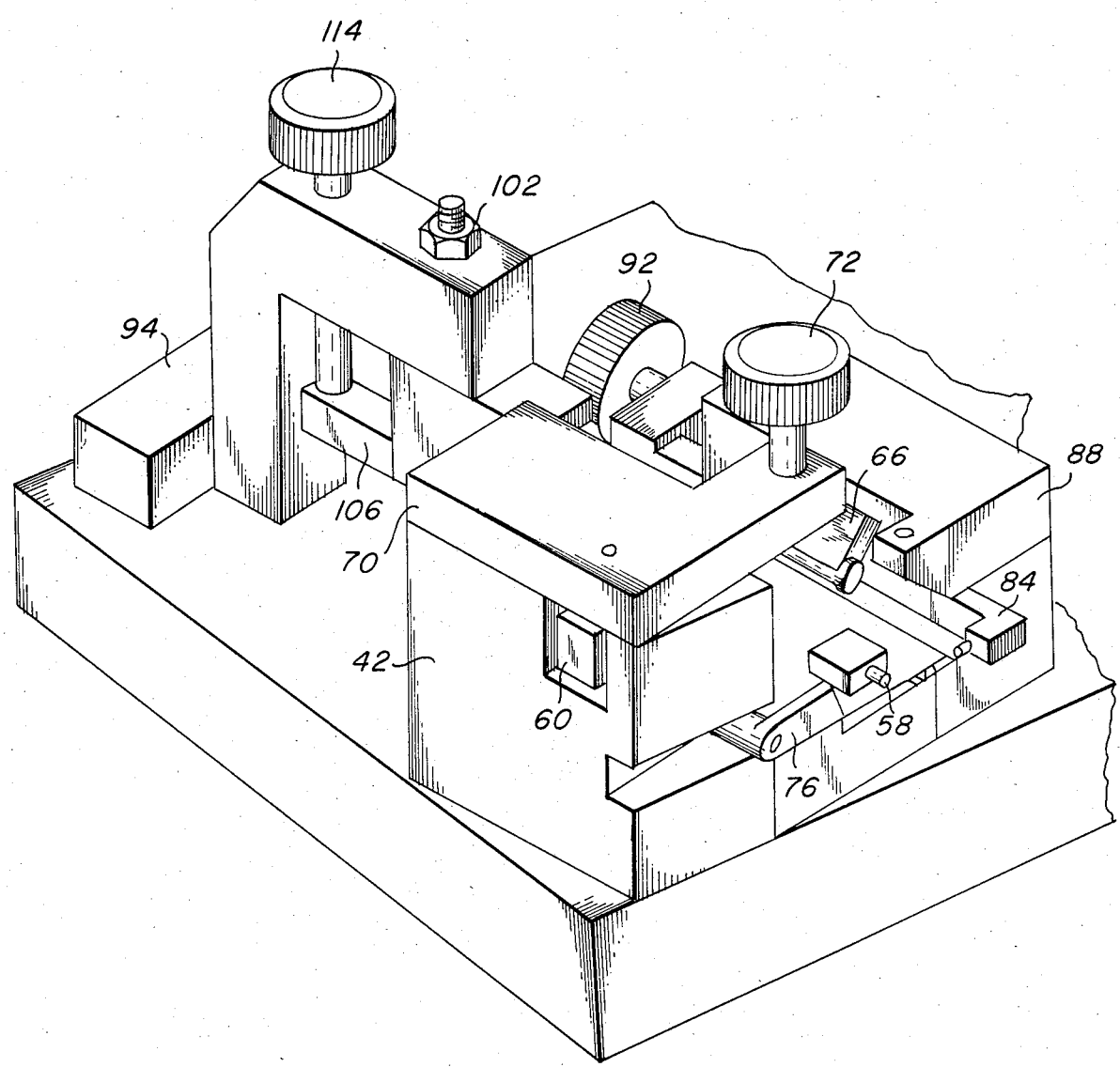
FIG. 14 is a front perspective view of the turbine blade holder of FIG. 3 in the assembled condition.

Referring now to FIGS. 3 and 14 the preferred turbine blade holding device 36 will be described in detail. The turbine blade holder includes a fixed base 42 having a front datum plate 44 and a rear datum plate 46 removably connected therewith. The datum plates may easily be replaced after they have become worn, whereby the down time of the holder is minimized.

Figure 5:
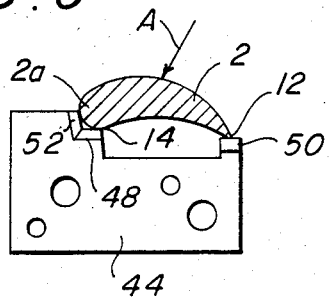
FIGS. 5 and 5a are front and side views, respectively, of a front datum plate of the holder for supporting a section of a turbine blade.
Figure 5A:
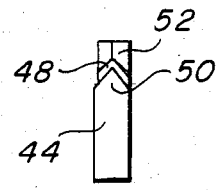

As shown in FIGS. 3 and 5, the front datum plate 44 supports the leading 10 and trailing 12 edges of a section of the turbine blade air foil portion 8 adjacent the shelf 6. The datum plate includes in the upper surface thereof a pair of horizontal knife-like support edges 48, 50 as shown in FIGS. 5 and 5a for supporting the leading and trailing edges, respectively, of the blade. As will be developed in greater detail below, the front datum plate 44 also includes an inclined knife edge 52 against which the forward portion 8a of the air foil abuts.

Figures 6, 6A:
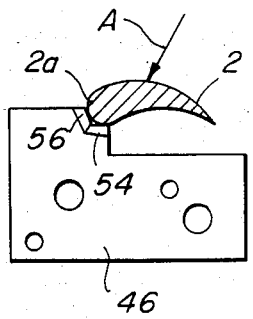
FIGS. 6 and 6a are front and side views, respectively, of a rear datum plate of the holder.

The rear datum plate 46 includes a horizontal knife edge 54 for supporting the leading edge of a remote section of the blade as shown in FIGS. 3, 6, and 6a. Owing to the configuration of the air foil portion of the blade, the trailing edge of the blade at the remote section thereof is not supported by the datum plate 46. The rear datum plate also includes an inclined knife edge 56 adjacent the horizontal support edge 54 against which the forward portion 8a of the air foil abuts, as will be developed in greater detail below.

Extending horizontally from and connected with the base is a pin 58. As will be developed below, when a turbine blade is longitudinally arranged on the base, its air foil portion 8 is supported on the front and rear datum plates and the datum point 22 on the blade shelf portion 16 is aligned with and engages the pin 58.

A clamping mechanism is connected with the base 42 to clamp the turbine blade against the datum plates and the pin. A clamp arm 60 is pivotally connected with the base 42 by a horizontally extending dowel 62 and a pair of spacing elements 64. At the remote end of the clamp arm 60 is connected a pivot clamp 66. The pivot clamp 66 is connected with the clamp arm by a swivel screw 68 which allows the clamp 66 to pivot relative to the clamp arm in both the longitudinal and lateral directions, i.e. from front to back and from side to side relative to the base 42.

A top plate 70 is connected with the base 42 above the clamp arm 60 as shown in the drawing. The top plate includes a threaded aperture located above the remote end of the clamp arm 60 which is adapted to receive a torque screw 72. The top plate also includes a through opening above the near end of the clamp arm 60 which is adapted to receive a spring 74. The spring normally biases the near end of the clamp arm 60 downwardly, whereby the remote end of the clamp arm is pivoted upwardly as the arm pivots about the dowel 62.

The characterizing feature of the clamping mechanism set forth above is that the clamp 66 extends longitudinally in the direction of the air foil portion 8 of the blade and contacts the convex surface of the air foil along the fulcrum thereof. As the torque screw 72 is rotated in one direction, its lower end pushes the remote end of the clamp arm 60 downwardly to pivot the clamp arm against the biasing force of the spring 74. The pivot clamp 66 is brought into contact with the blade air foil portion and pivots longitudinally and laterally to rest flush along the air foil convex surface. Further rotation of the torcue screw 72 increases the clamping force applied to the air foil by the pivot clamp.

Since the clamping force, represented by the arrow A in FIGS. 5 and 6, is through the fulcum of the blade air foil section, the first section of the air foil is clamped against the horizontal edges 48, 50 and the inclined edge 52 of the front datum plate 44 and the rear section of the air foil is clamped against the horizontal 54 and inclined 56 edges of the rear datum plate 46. The air foil is also fixed with its datum point aligned and in engagement with the pin 58 extending from the base 42.

With the turbine blade secured by the holding device in the above manner, the serrations may be accurately ground in the root form portion 4 thereof. In order to release the blade, the torgue screw 72 is rotated in the opposite direction to raise the clamp arm 60 which in turn raises the pivot clamp 66 away from the blade air foil portion. The blade may then be removed and a subseguent blade quickly inserted for machining of its root form. Moreover, a previously machined blade may also be re-inserted into the holding device and accurately held in the same position as originally held since the blade will be located and clamped against the same section and datum points as before.

Since all of the turbine blades of a particularly size and configuration have the same stacking axis and datum point, the present holding device is designed for locating and securing each blade relative to its stacking axis. Accordingly, the location of the pin 58 and the datum plates 44 and 46 relative to the pin is critical for each size and configuration of blade. Separate holding devices may thus be designed for blades having different sizes and configurations. In accordance with the present invention, however, all blades of a given size and configuration will be precisely held in the same location, whereby the serrations ground in the root form portions thereof will practically be identical. In this manner, all of the blades of a particular turbine assembly having blades of a given size and configuration will be within acceptable tolerance.

Referring once again to FIG. 3, additional clamps may be provided to further secure the turbine blade once the pivot clamp has been pressed against the fulcrum of the blade air foil section. More particularly, a spring clamp may be connected with the base 42 to further secure the blade at the shelf portion thereof. The spring clamp includes a generally L-shaped clamp 76, the longer leg 78 of which passes through a longitudinal opening in the base 42. A spring 80 fits over the remote end of the leg 78 adjacent the rear of the base, and a locking knob 82 is connected with the remote end of the leg 78 to secure and release the spring clamp.

A dead clamping mechanism is also provided to press the blade against the pin 58. The dead clamp includes a clamp arm 84 which pivots about a vertically extending dowel 86 which is arranged in a vertical opening in the base 42. A second top plate 88 is connected with the base and also contains a vertical opening to receive the dowel 86. The second top plate also contains an inclined opening adapted to receive a spring 90 which biases the clamp arm 84 in one direction of rotation about the vertical dowel 86. A torque screw 92 is connected with one end of the clamp arm and with the base to control the pivotal movement of the clamp arm 86 about the dowel. The opposite end of the clamp arm 84 is adapted to engage the shelf portion of the blade. Operation of screw 92 to rotate the arm in a clockwise direction forces the arm against the blade to press it against the pin 58.

An auxiliary clamping mechanism for the remote portion of an unshrouded turbine blade may also be provided for clamping the end of the air foil portion between its convex and concave surfaces. A base block 94 is pivotally connected with the base 42 of the holding device via a vertically arranged dowel 96 which passes through aligned openings in the base 42 and block 94. A pivot block 98 is connected with the base block 94. The pivot block includes a threaded vertical extension 100 which passes through a vertical opening in the block 94 and to which a nut 102 is connected. A spring 104 is arranged between the pivot block 98 and the base block 94. A clamp arm 106 is pivotally connected with the pivot block 98 via a horizontal laterally extending dowel 108. A first contact 110 is connected with the remote end of the clamp arm 106 and is adapted to contact the concave surface of the blade air foil portion. A second contact 112 is connected with the pivot block 98 and is adapted to contact the convex surface of the blade air foil portion. A torque screw 114 is threadably connected with a vertical threaded opening in the base block 94, with the lower portion of the screw engaging the clamp arm 106. Rotation of the screw 114 pivots the arm 106 abut the dowel 108 to bring the contacts 110 and 112 into clamping engagement with the opposite surfaces of the blade air foil portion.

Figure 4:
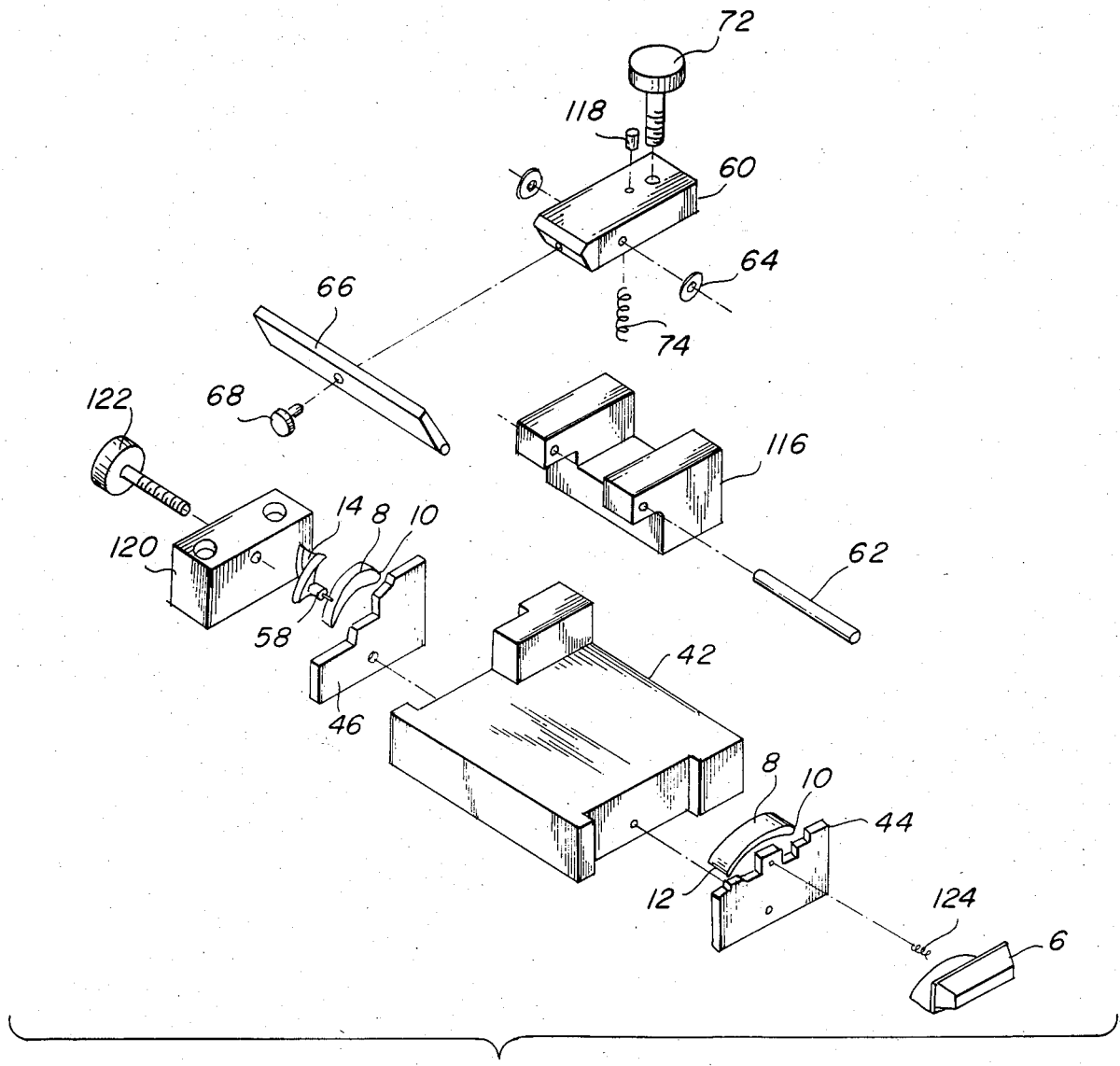
FIG. 4 is an exploded perspective view of a second embodiment of the turbine blade holder.

The turbine blade holding device according to the present invention may also be designed for securing turbine blades including a shroud portion 14 as shown in the embodiment of FIG. 4 wherein like reference numerals indicate elements corresponding with those of the embodiment of FIG. 3. Thus, the turbine blade holder includes a base 42 having front 44 and rear 46 datum plates removably connected with the base by any suitable means such as bolts not shown. The front and rear datum plates support the leading and trailing edges of the air foil portion 8 of a turbine blade in the same manner as discussed with the embodiment of FIG. 3.

The pin 58 of the holder of the embodiment of FIG. 4 is relocated to extend longitudinally horizontally from the rear of the base to abut against the datum point of the blade located on the shroud portion 14 thereof.

The base 42 includes a clamp yoke block 116 having aligned longitudinal openings to receive the dowel 62 about which the clamp arm 60 rotates. Spacers 64 space the clamp arm relative to the yoke block 116. The pivot clamp 66 is connected with the remote end of the arm 60 by a swivel screw connection 68. The spring 74 biases the arm and clamp 66 away from the surface of the blade air foil portion and the torque screw 72 controls the displacement of the clamping arm to control the clamping force applied to the fulcrum of the blade. A set screw 118 controls the biasing force of the spring 74.

The base 42 includes a block portion 120 which is connected with the base via a torque screw 122. The torque screw passes through aligned openings in the block 120 and the rear datum plate 47 and into a threaded opening (not shown) in the rear of the base. Tightening of the tension screw 120 forces the block against the shroud portion 14 of the blade which in turn is forced against the pin 58. A spring 124 is connected with the front datum plate 44 and is compressed against the shelf portion 6 of the blade. Once secure, the root form portion of the blade is ground to accurately form the serrations in the manner set forth above.

The turbine blade holding device of FIG. 7 is similar to that of FIG. 3, but for the blade clamping mechanism and the datum plates. Accordingly, like reference numerals have been used for the same elements of the holder of FIG. 3. In addition to the clamp arm 60, the holder of the embodiment of FIG. 7 includes a pair of auxiliary arms 130 pivotally connected with the base 42 by a pin (not shown) and spaced by spacers 132. At the free end of each auxiliary arm 130 is pivotally connected a contact plate 134. A pair of springs 74 normally bias the near ends of the auxiliary arms downwardly, whereby the remote or free ends thereof are pivoted upwardly, respectively.

As the torque screw 72 is rotated to push the remote end of the clamp arm 60 downwardly, the pivot clamp 66 pushes the remote ends of the auxiliary arms downwardly against the biasing force of the springs 74. The contact plates 134 are thus brought into contact with the blade air foil portion and pivot laterally to rest flush against the air foil convex surface. The contact plates thereby apply a clamping force through the fulcrum of the blade to clamp it against the front datum plate 136 and the rear datum plate 138 as shown more particularly in FIGS. 8–11.

An alternate datum plate design, adapted particularly for use with air foil blades whose thickness varies, is shown in FIGS. 8–11. These datum plates may be used to grind the root form on the airfoil regardless of the blade thickness as cast. FIGS. 8 and 9 show a front datum plate 136 utilizing 45° angle contacts to support the leading 10 and trailing 12 edges of the airfoil blade. In FIGS. 8 and 9, the blade is shown in the solid line 8 having a maximum thickness and in the broken line 8a having a minimum thickness. Owing to the contact plate 134 which is pivotally connected with the auxiliary arms 130, blades of both maximum and minimum thickness are accurately held against the datum plate. The distance X represents the set up dimension for the root form grinding operation relative to the root form centerline. In FIG. 9, Y represents the offset of the stacking point for the blade of minimum thickness relative to the blade of maximum thickness, which offset is accomodated by the datum plate design and by the pivotal contact plates, each of which contact the blade air foil at two locations as shown in FIGS. 8 and 9.

Figure 10:
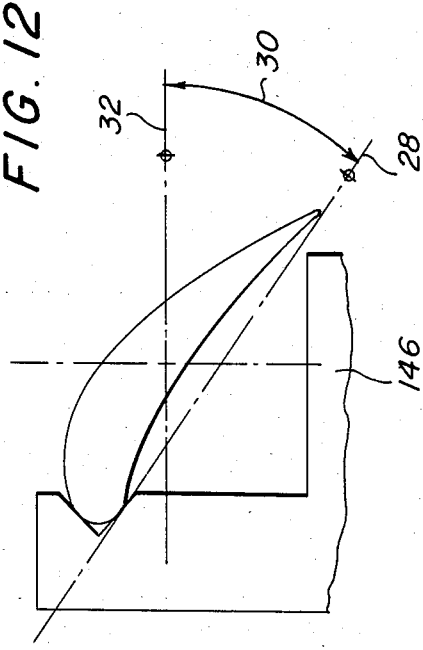
FIGS. 10 and 11 are partial front views of another design for the rear and front datum plates, respectively.
Figure 11:
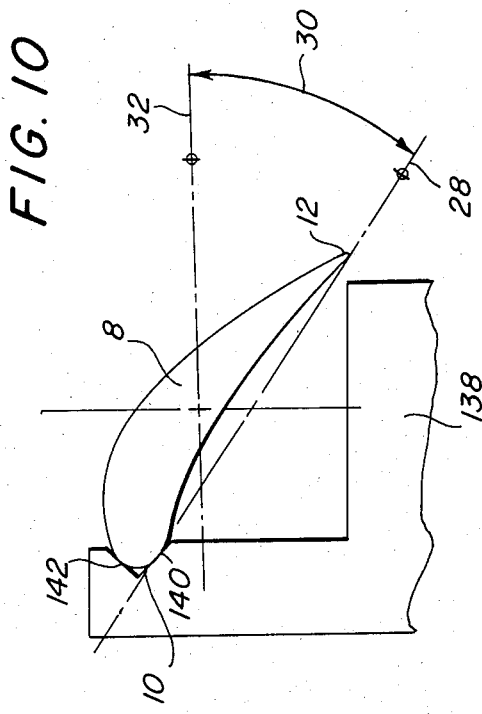

FIGS. 10 and 11 show the rear and front datum plates 138, 136 of the embodiment of FIG. 7. These datum plates locate the turbine blade at the leading edge 10 in knife edge support surfaces 140, 142 arranged at 90° relative to each other and normal to the blade extended root centerline 32. The trailing edge 12 of the blade rests on a knife edge support surface 144 on a 45° angle parallel to the leading edge support surface 140. The rear datum plate 138 of FIG. 10 is similar to the front plate but does not have a support surface for the blade trailing edge as in the case with the rear datum plate 46 of FIG. 6.

Figure 12:
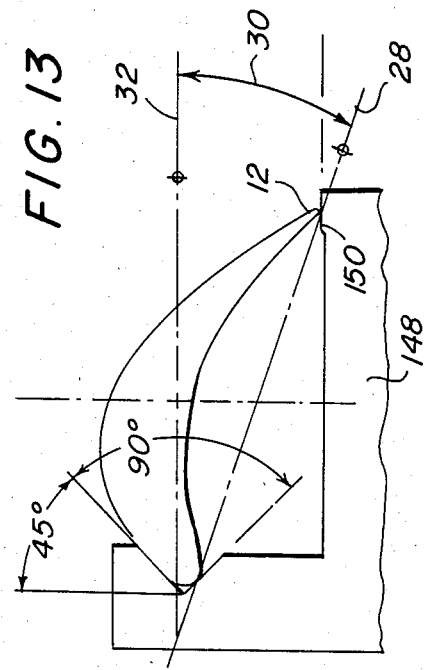
FIGS. 12 and 13 are partial front views of a further design for the rear and front datum plates, respectively.
Figure 13:
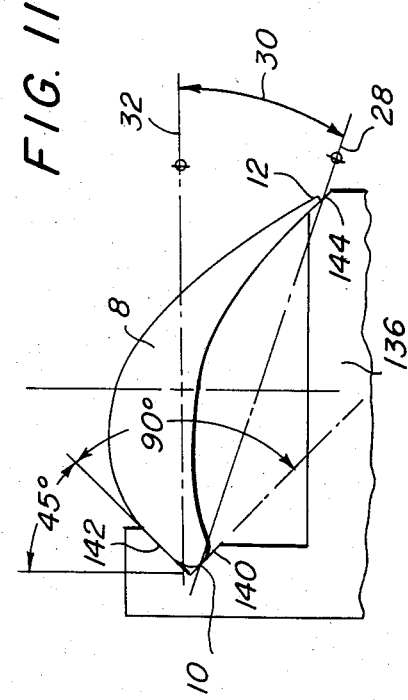

FIGS. 12 and 13 illustrate the rear and front datum plates 146, 148 of yet another plate design. These plates are for locating a turbine blade at the leading edge between support surfaces arranged at 90° relative to each other as in the design of FIGS. 10 and 11. The front plate 148, however, supports the blade trailing edge 12 on a support surface 150 in a plane parallel with the root form centerline 32.

It will be apparent that an infinite number of datum plate designs are available to suit the specifications of all shapes and sizes of turbine blades.

The turbine blade holding device is preferably formed of a durable metal such as iron or stainless steel.

The height of the horizontal support edges of the datum plates relative to the stacking axis of the blade, the spacing of the datum plates relative to the pin, and the location of the inclined support edge of the datum plates are all predetermined, either by calculations from a turbine blade or from settings provided by the manufacturer of the blade.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Apparatus for securely holding a turbine blade during grinding of the root form portion thereof, comprising
   (a) a fixed base;
   (b) a first datum plate connected with said base adjacent the front portion thereof for supporting the leading and trailing edges of a first section of the turbine blade;
   (c) a second datum plate connected with said base adjacent the rear portion thereof for supporting the leading edge of a second section of the turbine blade;
   (d) a longitudinally extending pin connected with said base and adapted to abut against the datum point of the blade; and
   (e) means for clamping the blade against said first and second datum plates and said pin, said clamping means including
      (1) a clamping device pivotally connected with said base and arranged along the fulcrum of the blade; and
      (2) means for displacing said clamping device against the upper surface of the blade.

2. Apparatus as defined in claim 1, wherein said clamping means further includes
   (3) a clamping arm pivotally connecting said clamping device with said base, said clamping device being pivotally connected with said clamping arm; and
   (4) spring means connected with said base for normally biasing said clamping arm away from the blade.

3. Apparatus as defined in claim 2, wherein said clamping device is elongated and extends generally parallel to the blade.

4. Apparatus as defined in claim 1, wherein said clamping means comprises
   (3) a clamping arm pivotally connected with said base;
   (4) a pair of auxiliary arms pivotally connected with said base and arranged below and generally parallel to said clamping arm, whereby displacement of said clamping arm displaces said auxiliary arms, said clamping device being pivotally connected with said auxiliary arms; and (5) spring means connected with said base for normally biasing said auxiliary arms away from the blade.

5. Apparatus as defined in claim 4, wherein said clamping device comprises a pair of contact plates connected with said pair of auxiliary arms, respectively.

6. Apparatus as defined in claim 2, wherein said clamp displacing means comprises torque screw means threadably connected with said base for pivoting said clamping arm against the biasing force of said spring means.

7. Apparatus as defined in claim 6, wherein said first and second datum plates are located at a given position relative to said pin, respectively.

8. Apparatus as defined in claim 7, wherein said first and second datum plates are removably connected with said base.

9. Apparatus as defined in claim 8, wherein said first datum plate includes adjacent the upper surface thereof a horizontal support edge for supporting the leading and trailing edges of the blade and an inclined edge against which the front leading portion of the blade is urged upon operation of said clamping means.

10. Apparatus as defined in claim 9, wherein said second datum plate includes adjacent the upper surface thereof a horizontal support edge for supporting the leading edge of the blade and an inclined edge against which the front leading portion of the blade is urged upon operation of said clamping means.

11. Apparatus as defined in claim 8, wherein said first and second datum plates include a first blade leading edge support surface arranged at a 45° angle from vertical and a second blade leading edge support surface arranged at a 90° angle from said first surface to define a 90° recess for receiving the leading edge of the blade.

12. Apparatus as defined in claim 11, wherein said first datum plate includes a first blade trailing edge support surface parallel to said second blade leading edge support surface.

13. Apparatus as defined in claim 11, wherein said first datum plate includes a horizontal first blade trailing edge support surface.

14. Apparatus as defined in claim 6, and further comprising spring clamp means connected with said base for further clamping the blade.

15. Apparatus as defined in claim 9, and further comprising dead clamp means connected with said base for locking the blade in the clamped position in contiguous relation with said pin.

16. Apparatus as defined in claim 10, wherein said pin is arranged at the front portion of said base adjacent said first datum plate for engaging a datum point on the shelf portion of the blade.

17. Apparatus as defined in claim 14, and further comprising auxiliary clamping means connected with the rear portion of said base for clamping the blade between the convex and concave surfaces thereof.

18. Apparatus as defined in claim 10, wherein said pin is arranged at the rear portion of said base adjacent said second datum plate for engaging a datum point on the shroud portion of the blade.

* * * * *